(12) United States Patent
De Natale et al.

(10) Patent No.: US 8,934,208 B2
(45) Date of Patent: Jan. 13, 2015

(54) TRIP CIRCUIT SUPERVISION RELAY FOR LOW AND MEDIUM VOLTAGE APPLICATIONS

(75) Inventors: Gabriele Valentino De Natale, Milan (IT); Andrea Bianco, Sesto San Giovanni (IT)

(73) Assignee: ABB Technology AG, Zurich (CH)

( * ) Notice: Subject to any disclaimer, the term of this patent is extended or adjusted under 35 U.S.C. 154(b) by 494 days.

(21) Appl. No.: 13/182,728

(22) Filed: Jul. 14, 2011

(65) Prior Publication Data

US 2012/0014032 A1 Jan. 19, 2012

(30) Foreign Application Priority Data

Jul. 15, 2010 (EP) .................................... 10169636

(51) Int. Cl.
*H02H 3/08* (2006.01)
*H02H 9/02* (2006.01)
*H01H 47/00* (2006.01)
*H02H 3/04* (2006.01)

(52) U.S. Cl.
CPC ............. *H01H 47/002* (2013.01); *H02H 3/044* (2013.01)
USPC ........................................................ 361/93.1

(58) Field of Classification Search
USPC ............................ 361/115, 18, 87, 93.1, 93.2
See application file for complete search history.

(56) References Cited

U.S. PATENT DOCUMENTS

| 6,426,856 B1 * | 7/2002 | Schneerson et al. ............ 361/79 |
| 2010/0027179 A1 * | 2/2010 | Di Maio et al. ............... 361/93.8 |

FOREIGN PATENT DOCUMENTS

| EP | 0994546 | 4/2000 |
| EP | 2149895 | 2/2010 |
| KR | 100903149 | 6/2009 |

* cited by examiner

*Primary Examiner* — Rexford Barnie
*Assistant Examiner* — Christopher Clark
(74) *Attorney, Agent, or Firm* — Novak Druce Connolly Bove + Quigg LLP

(57) ABSTRACT

A Trip Circuit Supervision (TCS) relay for Low and Medium Voltage applications operatively connectable to a trip circuit of a Low or Medium Voltage apparatus, said TCS relay comprising first means for detecting the current circulating in said trip circuit, second means for detecting the continuous component of the current circulating in said trip circuit, third means for detecting the presence of pulses in the current circulating in said trip circuit, first enabling means for enabling said third means for detecting the presence of pulses in the current circulating in said trip circuit, signal generating means connected in input to said second and third means for detecting, respectively, the continuous component of and the presence of pulses in the current circulating in said trip circuit, and connected in output to control means operatively connectable to alarm generating means.

18 Claims, 4 Drawing Sheets

Prior Art

TRIP CIRCUIT SUPERVISION RELAY FOR LOW AND MEDIUM VOLTAGE APPLICATIONS

CROSS REFERENCE TO RELATED APPLICATIONS

This application claims priority to Application No. 10169636.7 filed in Europe on Jul. 15, 2010 under 35 U.S.C. § 119, the entire contents of which are hereby incorporated by reference.

BACKGROUND OF THE INVENTION

The present invention relates to an improved Trip Circuit Supervision relay for Low and Medium Voltage applications. The Trip Circuit Supervision relay of the invention is conveniently used in trip circuits of Low or Medium Voltage apparatuses (e.g., circuit breakers, contactors, disconnectors). Low or Medium Voltage apparatuses including a trip circuit and a Trip Circuit Supervision relay as described herein are also part of the present invention. For the purposes of the present application the term medium voltage is referred to applications in the range of between 1 and 50 kV and low voltage is referred to applications in the range below 1 kV.

With reference to FIG. 1, a conventional trip circuit 10 in an apparatus, such as a Medium Voltage circuit breaker, controls the opening and closing driver 12, i.e. the mechanism/electronics driving the opening and closing operations, through, e.g. a switch 13.

In traditional mechanical circuit breaker, the driver 12 is a shunt release consisting in an electromagnet that releases a spring. As a result, the spring performs the required opening or closing operation. In modern circuit breakers and switches, the trip circuit 10 drives binary inputs of an electronic device 12. The electronic device 12, e.g. a power and control unit, processes the commands received from the trip circuit 10 and drives the actuators (not shown), such as motors, electromagnets, etc., to operate the circuit breakers and switches.

In all cases, in order to have highly reliable applications, it is important to check continuously the trip circuit 10 to make sure that it will work when required. To this purpose, Trip Circuit Supervision (TCS) relays 11 are normally used, said TCS relay being capable to detect the functionality of the trip circuit 10 and generate an alarm signal 15, by e.g., closing a contact 14.

Common Trip Circuit Supervision relay 11 are designed to check the low impedance of the trip circuit 10 and to detect when the trip circuit 10 turns into an open circuit. This occurs when the connection is broken or the wire of the electromagnet winding is burned by an overcurrent.

However, the open circuit is only one of the potential failure modes of the shunt release. Modern Low and Medium Voltage apparatuses, e.g. Medium Voltage circuit breakers, employ shunt releases with electronic drivers 12 that reduce significantly the probability of the open circuit failure. However, other failure modes, which cannot be detected by common Trip Circuit Supervision relays of the above type, are more likely.

Another type of Trip Circuit Supervision relay measures continuously the shunt releases winding electrical resistance. This Trip Circuit Supervision relay is able, in principle, to detect any failure in the winding. Unfortunately it can be used only for electromagnetic actuators, without electronic driver.

As a matter of fact, none of the existing Trip Circuit Supervision relays is able to detect failures, such as short circuit of the binary inputs (or shunt release) and any other type of failure in the electronic circuit of the binary input of the power and control unit, because a current may continue to flow in the trip circuit.

BRIEF SUMMARY OF THE INVENTION

It is therefore an object of the present invention to provide a Trip Circuit Supervision relay for low and medium voltage applications that solves the above-mentioned problems.

More in particular, it is an object of the present invention to provide a Trip Circuit Supervision relay for low and medium voltage applications having improved performance in terms of failure detection functionalities.

As a further object, the present invention is aimed at providing a Trip Circuit Supervision relay that is able to detect short circuit conditions at the power and control unit, as well as to detect the functionality of the binary inputs used in the power and control unit itself.

Still a further object of the present invention is to provide a Trip Circuit Supervision relay that is able to detect a failure in the HW or SW of the power and control unit.

Another object of the present invention is to provide a Trip Circuit Supervision relay that is able to detect and signal failures in the actuator of a low or medium voltage apparatus.

Still another object of the present invention is to provide a Trip Circuit Supervision relay that is able to detect internal failures of the Trip Circuit Supervision relay itself.

Still another object of the present invention is to provide a Trip Circuit Supervision relay that can be easily and effectively interfaced with existing low and medium voltage apparatuses.

Still another object of the present invention is to provide a Trip Circuit Supervision relay for low and medium voltage applications that can be easily manufactured and at competitive costs.

Thus, the present invention relates to a Trip Circuit Supervision relay for Low and Medium Voltage applications operatively connectable to a trip circuit of a Low or Medium Voltage apparatus, such as circuit breakers, contactors, disconnectors.

The Trip Circuit Supervision relay of the invention comprises first means for detecting the current circulating in said trip circuit, second means for detecting the continuous component of the current circulating in said trip circuit, third means for detecting the presence of pulses in the current circulating in said trip circuit, first enabling means for enabling said third means for detecting the presence of pulses in the current circulating in said trip circuit, signal generating means connected in input to said second and third means for detecting, respectively, the continuous component of and the presence of pulses in the current circulating in said trip circuit, and connected in output to control means operatively connectable to alarm generating means.

In a further aspect, the present invention relates to a Low or Medium Voltage apparatus, e.g. a circuit breaker, contactor, disconnector, and the like, characterized in that it comprises a trip circuit operatively connected to a Trip Circuit Supervision relay as described herein.

In this way, it is possible to overcome some of the disadvantages and drawbacks of the Trip Circuit Supervision relays of the known art. In practice, thanks to the third means for detecting the presence of pulses in the current circulating in the trip circuit it is possible to perform continuously a full failure analysis of the trip circuit, as better described hereinafter, thereby detecting any single point of failure in the trip circuit. In addition, since said third means for detecting the presence of pulses in the current circulating in said trip circuit can be selectively enabled, as better described hereinafter, it is still possible to interface the Trip Circuit Supervision relays with existing products and installations, thereby using the same relay for both conventional and enhanced applications.

Preferably, the Trip Circuit Supervision relay according to the invention comprises first self-diagnostic means for detecting the status of said Trip Circuit Supervision relay. In such a case, the Trip Circuit Supervision relay of the invention conveniently comprises second enabling means for enabling said first self-diagnostic means.

Advantageously that said control means can comprise a control logic.

Alternatively, said control means may comprise a pair of oscillating contacts connectable to said alarm generating means.

In the latter case, a possible embodiment of the Trip Circuit Supervision relay according to the invention, foresees that said first self-diagnostic means comprise a pulse generator that modulates the status of said pair of oscillating contacts. Preferably, said pulse generator is enabled by said second enabling means.

In a preferred embodiment of the Low or Medium Voltage apparatus according the invention, the trip circuit is operatively connected to a power and control unit driving an actuator of said Low or Medium Voltage apparatus, said power and control unit comprising a power driver that drives said actuator and a binary input that detects the voltage applied at input terminals of said power and control unit and controls said power driver.

Advantageously, said power and control unit may comprise second self-diagnostic means for checking the functionalities of said power and control unit.

In a largely preferred embodiment of the Low or Medium Voltage apparatus according to the present invention, said power and control unit comprises a current generator that drives a pulsed current in said trip circuit. In such a case, said pulsed current may be detected in said Trip Circuit Supervision relay by said third means for detecting the presence of pulses in the current circulating in said trip circuit.

Preferably, in case of failure in the software or hardware of said power and control unit, said second self-diagnostic means interrupt said pulsed current.

Also, in case a failure is detected in said actuator, said power and control unit can advantageously interrupt said pulsed current.

BRIEF DESCRIPTION OF THE SEVERAL VIEWS OF THE DRAWINGS

Further characteristics and advantages of the invention will emerge from the description of preferred, but not exclusive, embodiments of the Trip Circuit Supervision relay for low or medium voltage applications according to the invention, as well as of the Low or Medium Voltage apparatus according to the present invention, non-limiting examples of which are provided in the attached drawings, wherein.

DETAILED DESCRIPTION OF THE INVENTION

Figure 1:
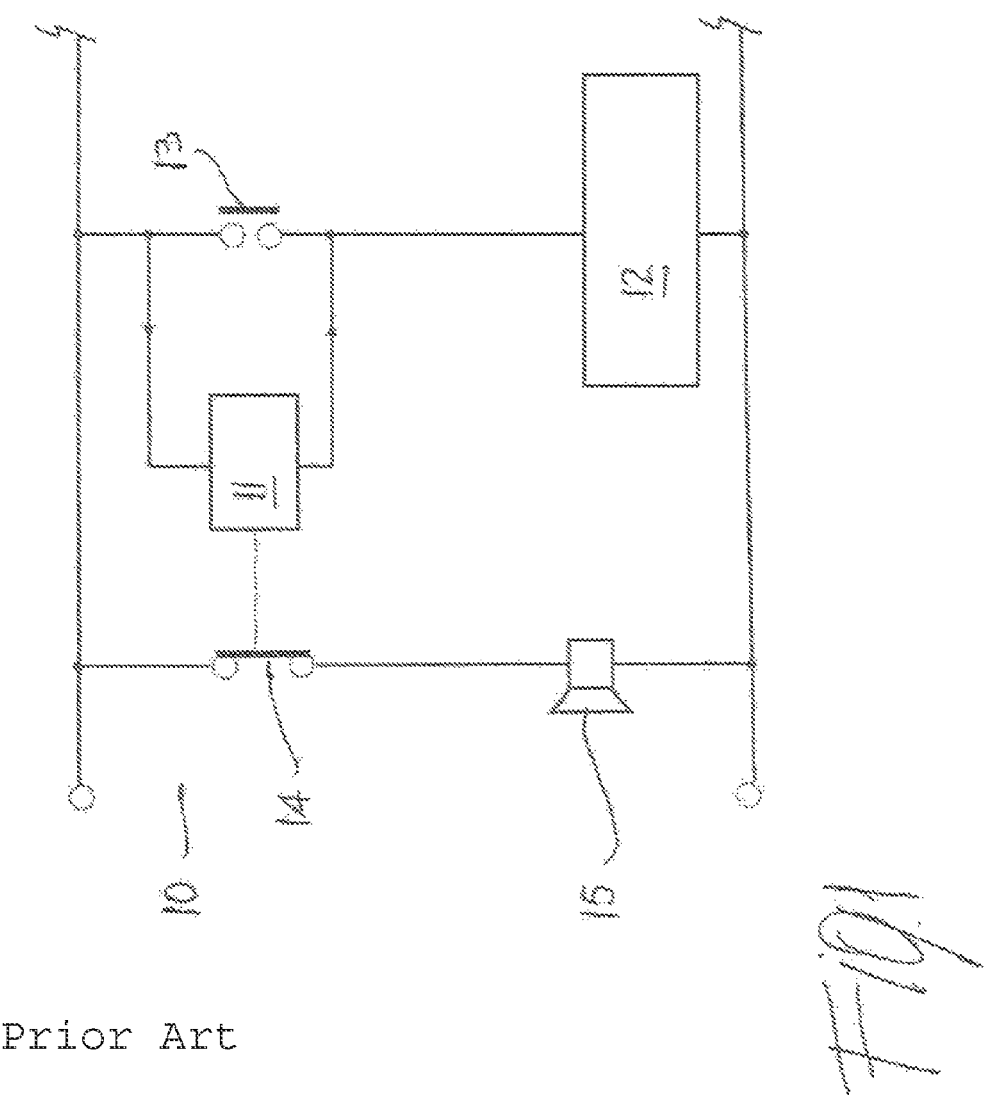
FIG. 1 is a block scheme of an example of a trip circuit including a Trip Circuit Supervision relay according to the prior art.
Figure 2:
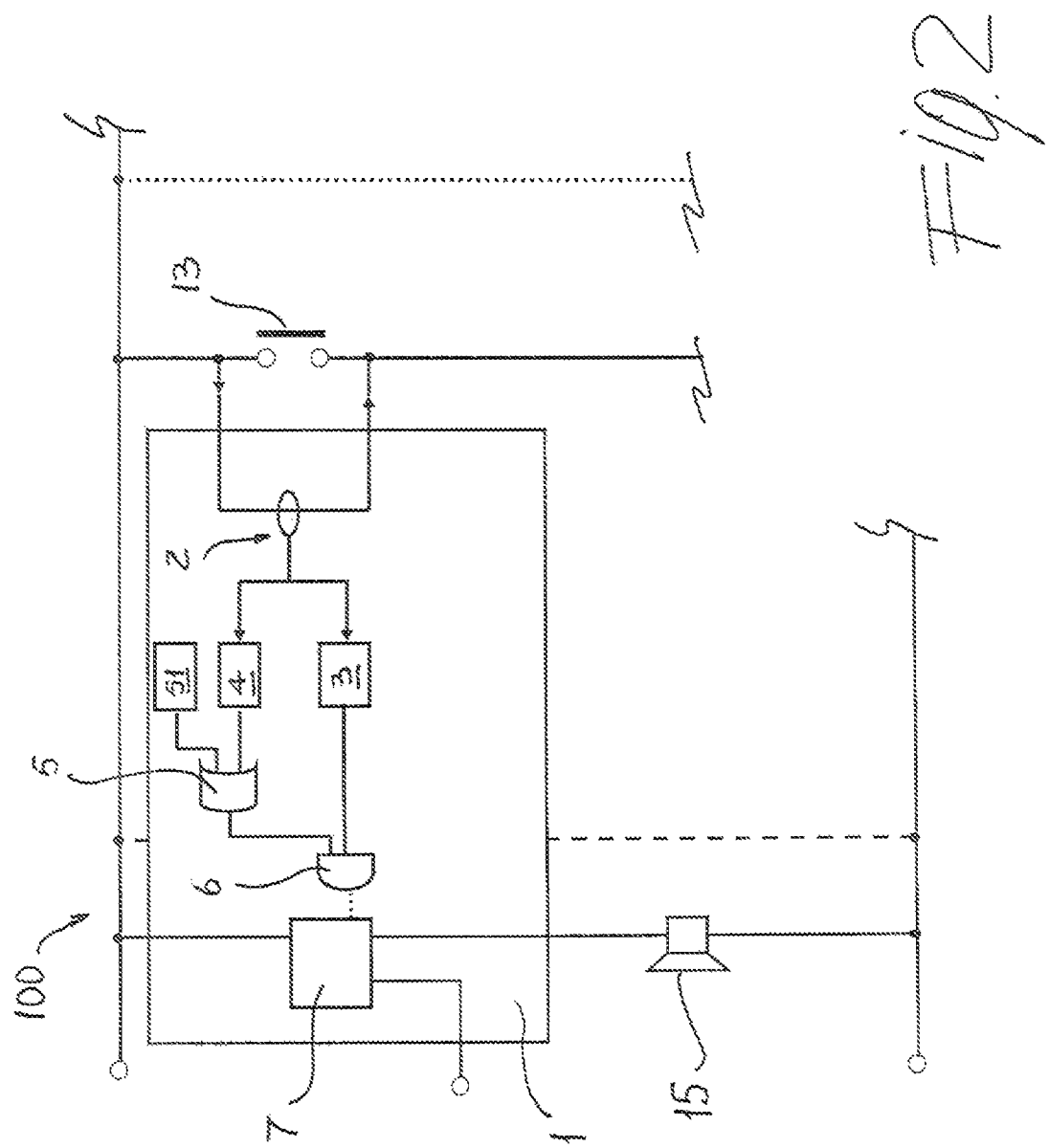
FIG. 2 is a block scheme of a general embodiment of the Trip Circuit Supervision relay according to the invention.

With reference to FIG. 2, the Trip Circuit Supervision relay, designated with the reference number 1, in its more general definition, is connected to a trip circuit 100 (shown only partially). The Trip Circuit Supervision relay 1 comprises first means 2 for detecting the current circulating in said trip circuit 100, that can be, for instance, conventional current sensors.

The Trip Circuit Supervision relay 1 also comprises second means 3 for detecting the continuous component of the current circulating in said trip circuit 100, as well as third means 4 for detecting the presence of pulses in the current circulating in said trip circuit 100. The third means 4 for detecting the presence of pulses in the current circulating in said trip circuit 100 can be enabled by first enabling means 5, through, e.g. a pulse detection enabling command 51, as better described hereinafter.

Furthermore, the Trip Circuit Supervision relay 1 of the invention also comprises signal generating means 6 which are connected in input to said second 3 and third 4 means for detecting, respectively, the continuous component of and the presence of pulses in the current circulating in said trip circuit 100. The connection towards the third detecting means 4 is effective only when said third detecting means 4 are enabled by the first enabling means 5.

The signal generating means 6 are then connected in output to control means 7 operatively connectable to alarm generating means 15.

In practice, when the third means 4 for detecting the presence of pulses in the current circulating in the trip circuit 100 are not enabled, the Trip Circuit Supervision relay 1 of the invention can work as a conventional TCS detecting only the presence of a current in the trip circuit 100 (through the second means 3 for detecting the continuous component of the current) and generating a corresponding alarm signal 15 in case a failure is detected. Thus, in view of this, the Trip Circuit Supervision relay 1 can operate also with existing products and installations that do not have enhanced features in terms of failure detection.

When an enabling signal 51 is sent to the first enabling means 5, the Trip Circuit Supervision relay 1 of the invention detects also the presence of pulses in the current circulating in said trip circuit 100 (through the third means 4 for detecting the presence of said pulses), thereby being able to detect and signal any single point of failure in the trip circuit, as better described hereinafter.

Figure 3:
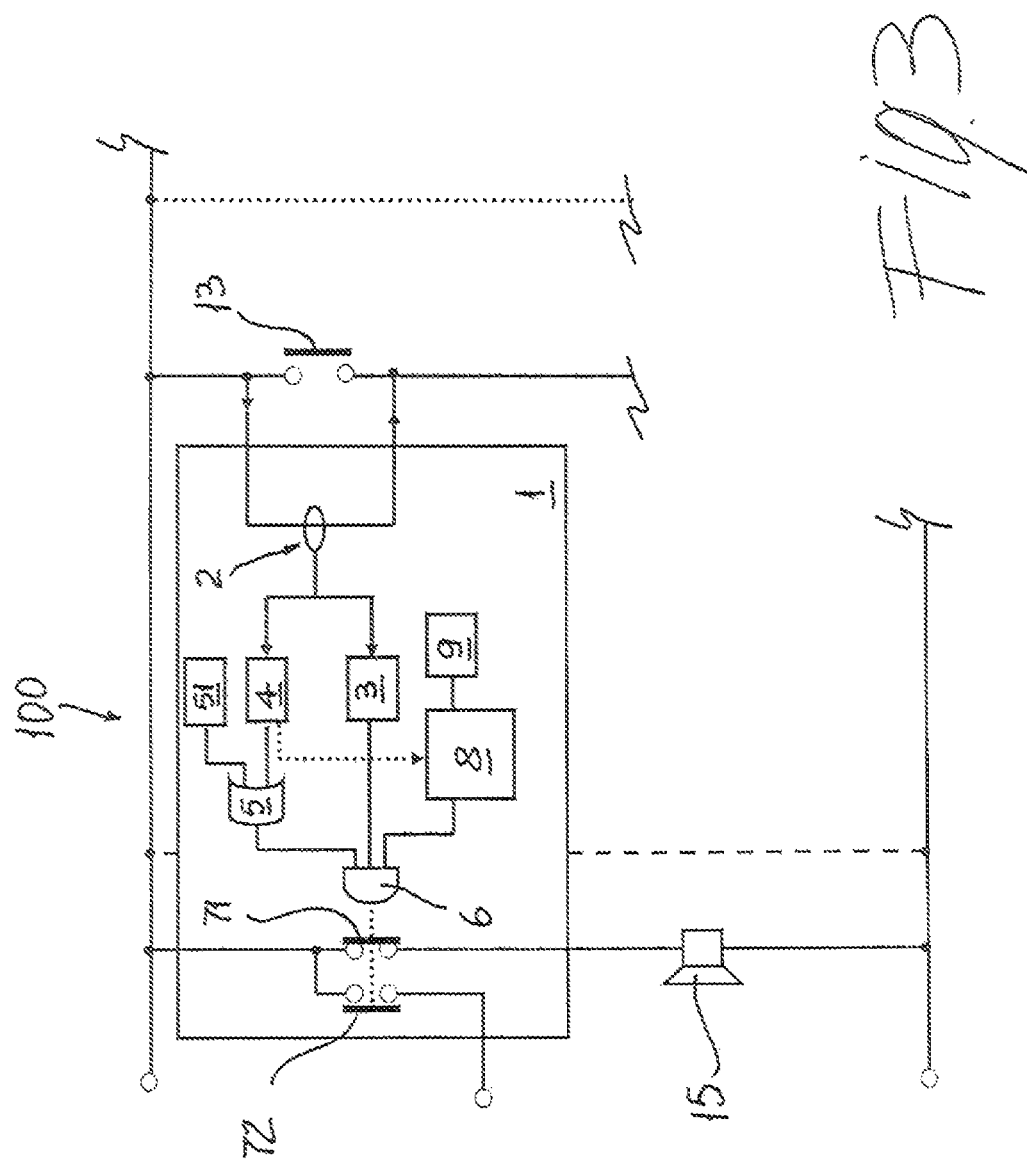
FIG. 3 is a block scheme of a first particular embodiment of the Trip Circuit Supervision relay according to the invention.

With reference to FIG. 3, in a preferred embodiment of the Trip Circuit Supervision relay 1 according to the invention, the relay 1 also comprises first self-diagnostic means 8 for detecting the status of said Trip Circuit Supervision relay 1. Said self-diagnostic means 8 can be always active or, as preferred, they can be selectively activated according to the needs, through second enabling means 9 for enabling said first self-diagnostic means 8.

Thus, when the self-diagnostic means 8 are enabled, it is possible to check the status of the Trip Circuit Supervision relay 1 and generate an alarm signal 15 in case of failure.

It is worth noting that when both the self-diagnostic means 8 and the third means 4 for detecting the presence of pulses in the current circulating in the trip circuit 100 are enabled, it is possible to detect any single point of failure in the trip circuit 100, including the Trip Circuit Supervision relay 1 itself. Such a result has never been achieved with conventional TCS relays.

According to a possible embodiment of the Trip Circuit Supervision relay 1 of the invention, said control means 7 comprises a control logic.

Alternatively, as shown in FIG. 3, said control means 7 may comprise a pair of oscillating contacts 71 and 72. In such a case, said first self-diagnostic means 8 may conveniently comprise a pulse generator that modulates the status of said pair of oscillating contacts 71 and 72. This generates a signal similar to a watchdog that can be detected by another intelligent electronic device (not shown). The position of contacts 71 and 72 in FIG. 3 correspond to a situation in which the Trip Circuit Supervision relay 1 is not energized, which matches also with a failure status. In such a case the contact 71 directly supplies an alarm signal 15. Conversely, when both the current flowing in the trip circuit and the pulses are detected by the Trip Circuit Supervision relay 1, contacts 71 and 71 are in the active position (corresponding to an OK status signal).

Advantageously, when a pulse generator is present in the first self-diagnostic means 8 of the Trip Circuit Supervision relay 1, said pulse generator can be enabled by said second enabling means 9.

When the self-diagnostic function of the Trip Circuit Supervision relay 1 is disabled, pulses are not generated and the status of contacts 71 and 72 is not modulated. In such a case, it is possible to increase the reliability of the system using a redundant Trip Circuit Supervision relay connected in series to the trip circuit 100.

Figure 4:
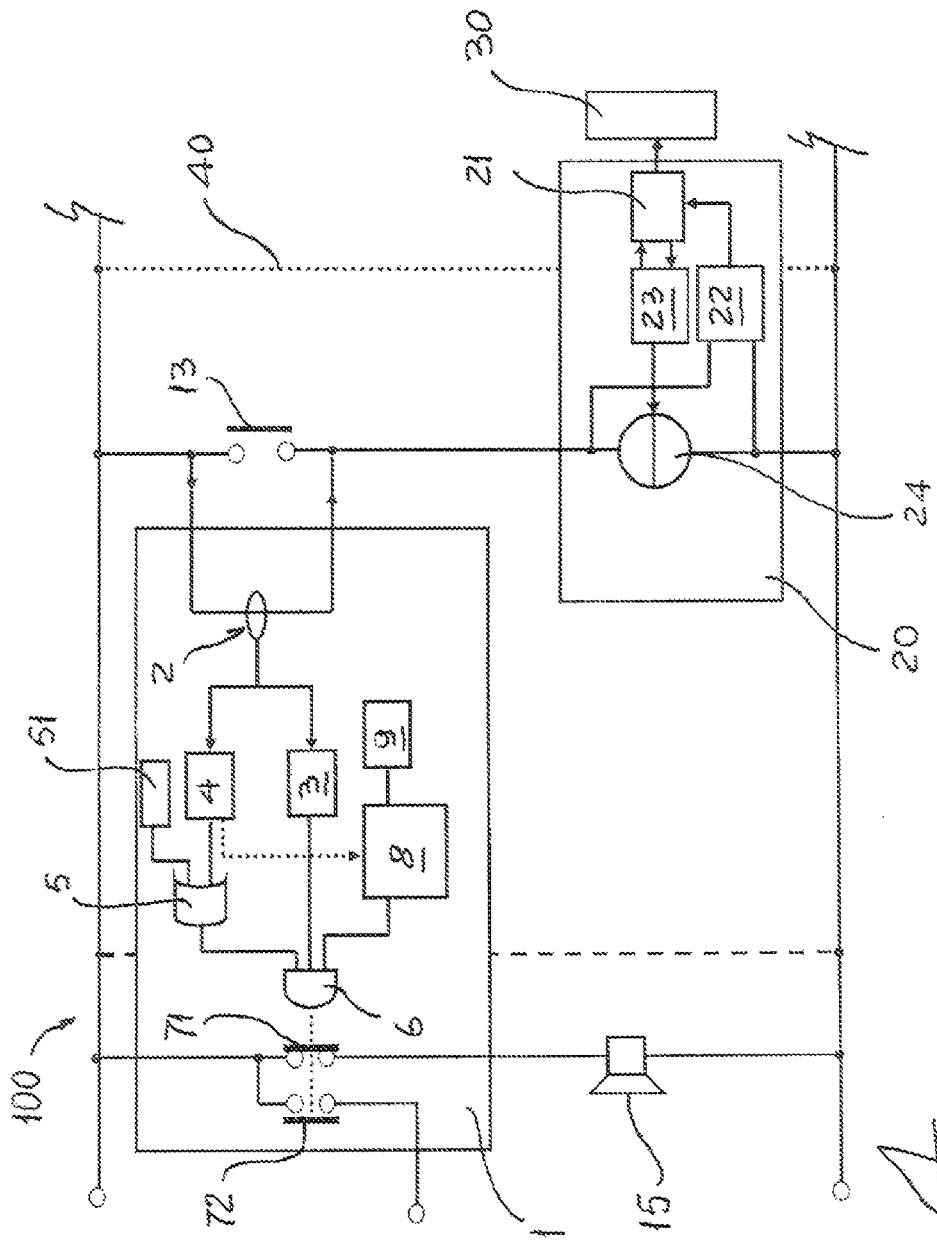
FIG. 4 is a block scheme of a trip circuit including a Trip Circuit Supervision relay according to the invention used in a Low or Medium Voltage apparatus according to the present invention.

With reference to FIG. 4 a typical application of a Trip Circuit Supervision relay 1 according to the invention in a Low or Medium Voltage apparatus will be now described.

Typically, Low or Medium Voltage apparatus, e.g. a circuit breaker, comprises a trip circuit 100, whereto the Trip Circuit Supervision relay 1 is connected.

The trip circuit 100 is also operatively connected to a power and control unit 20 which drives an actuator 30 of said Low or Medium Voltage apparatus.

Said power and control unit 20 typically comprises a power driver 21 that drives said actuator 30 and a binary input 22 that detects the voltage applied at input terminals of said power and control unit 20 and controls said power driver 21. Thus, depending of said voltage an appropriate opening/closing command is sent to the actuator 30 in order to carry out the desired opening/closing operation. This can be achieved by closing the contact 13, thereby closing the trip circuit 100 and commanding the power and control unit to operate the actuator so as to carry out the desired opening/closing operation.

Advantageously, said power and control unit 20 also comprises second self-diagnostic means 23 for checking the functionalities of said power and control unit 20. Further, said power and control unit 20 comprises a current generator 24 that drives a pulsed current in said trip circuit 100.

The power and control unit 20 may have an optional power supply input 40 or may take the power directly form the trip circuit.

As shown in FIG. 4, said second self-diagnostic means 23 control the current generator 24 and, when no failure is detected, the current generator 24 drives a pulsed current in said trip circuit 100; said pulsed current is then detected in said Trip Circuit Supervision relay 1 by said third means 4 for detecting the presence of pulses in the current circulating in said trip circuit 100.

When an internal failure in the power and control unit 20 (hardware or software), or a failure in the actuator 30, occurs, the second self-diagnostic means 23 stop the current generator 24 and a pulsed current is no longer driven in the trip circuit 100. As a consequence, there is no pulsed current detection by said third means 4 in the Trip Circuit Supervision relay 1, and an alarm signal 15 is generated.

The diagnostic works when the trip circuit is open (contact 13 open). In such a case, the current flows through the Trip Circuit Supervision relay 1 and the current generator 24 of the power and control unit 20.

In view of the above, it is clear that Trip Circuit Supervision relay 1 of the present invention fully achieve the intended objects and aims. In particular, thanks to the use of a Trip Circuit Supervision relay 1 according to the invention, a complete failure detection, at any point of the trip circuit, is possible.

In practice:
- a short circuit condition at the input of the power and control unit 20 is detected by the Trip Circuit Supervision relay 1, because, as a result of such a failure, the current in the trip circuit 100 is not pulsed anymore;
- a failure in the hardware or software of the power and control unit 20 causes the second self-diagnostic means 23 to stop the current generator 24 and a pulsed current is no longer driven in the trip circuit 100;
- when a failure is detected in the actuator, the power and control unit 20 stops the current generator 24, thereby interrupting the pulsed current in the trip circuit 100.

In all cases, there is no pulsed current detection by said third means 4 in the Trip Circuit Supervision relay 1, and an alarm signal 15 is generated.

In addition, possible failure conditions, e.g. short circuit, in said pair of oscillating contacts 71 and 72 of the Trip Circuit Supervision relay 1 can be detected when the first self-diagnostic means and pulse generator 8 are enabled, thereby achieving a complete failure control of the whole trip circuit 100, including the Trip Circuit Supervision relay 1.

The Trip Circuit Supervision relay for low and medium applications thus conceived, as well the low or medium voltage apparatuses including said Trip Circuit Supervision relay, may undergo numerous modifications, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A Trip Circuit Supervision relay for Low and Medium Voltage applications operatively connectable to a trip circuit of a Low or Medium Voltage apparatus, comprising:
    a power and control circuit driving an actuator of said Low or Medium Voltage apparatus, said power and control circuit including a pulse current generator that drives a pulsed current in said trip circuit;
    a first detector configured to detect the current circulating in said trip circuit;
    a second detector configured to detect the continuous component of the current circulating in said trip circuit;
    a third detector that can be selectively enabled and that is configured to detect the presence of pulses, including at least pulses generated by the pulse current generator, in the current circulating in said trip circuit,
    a first enabling circuit configured to enable said third detector and responsive to at least an enable signal, said enable signal being independent of current circulating in the power and control circuit;
    an alarm generating circuit;
    a controller connected to the alarm generating circuit;
    wherein the third detector, when enabled, and in response to a failure to detect pulses generated by the pulse current generator, cooperates with the alarm generating circuit to generate an alarm.

2. The Trip Circuit Supervision relay according to claim 1, further comprising a first self-diagnostic circuit configured to detect the status of said Trip Circuit Supervision relay.

3. The Trip Circuit Supervision relay according to claim 2, further comprising a second enabling circuit configured to enable said first self-diagnostic circuit.

4. The Trip Circuit Supervision relay according to claim 1, wherein said controller comprises control logic.

5. The Trip Circuit Supervision relay according to claim 1, wherein said controller comprises a pair of oscillating contacts.

6. The Trip Circuit Supervision relay according to claim 2, wherein said controller comprises a pair of oscillating contacts and wherein said first self-diagnostic circuit comprises a pulse generator, and modulates the status of said pair of oscillating contacts.

7. The Trip Circuit Supervision relay according to claim 6, wherein said pulse generator is enabled by a second enabling circuit.

8. A Low or Medium Voltage apparatus wherein it comprises a trip circuit operatively connected to a Trip Circuit Supervision relay according to claim 1.

9. The Low or Medium Voltage apparatus according to claim 8, wherein said trip circuit is operatively connected to the power and control unit, which drives the actuator of said Low or Medium Voltage apparatus, said power and control unit comprising a power driver that drives said actuator and a binary input that detects the voltage applied at input terminals of said power and control unit and controls said power driver.

10. The Low or Medium Voltage apparatus according to claim 9, wherein said power and control unit include a second self-diagnostic circuit configured to check the functionalities of said power and control unit.

11. The Low or Medium Voltage apparatus according to claim 10, wherein the second self-diagnostic circuit is configured to interrupt said pulsed current in case of failure in said power and control unit.

12. The Low or Medium Voltage apparatus according to claim 1, wherein the power and control unit is configured to interrupt said pulsed current in case a failure is detected in said actuator.

13. A Low or Medium Voltage apparatus, comprising a trip circuit operatively connected to a Trip Circuit Supervision relay according to claim 9.

14. The Trip Circuit Supervision relay according to claim 1, wherein said controller comprises control logic.

15. The Trip Circuit Supervision relay according to claim 2, wherein said controller comprises control logic.

16. The Trip Circuit Supervision relay according to claim 1, wherein said controller comprises a pair of oscillating contacts.

17. The Trip Circuit Supervision relay according to claim 2, wherein said controller comprises a pair of oscillating contacts.

18. A Low or Medium Voltage apparatus wherein it comprises a trip circuit operatively connected to a Trip Circuit Supervision relay according to claim 1.

* * * * *